(12) United States Patent
Kasahara

(10) Patent No.: US 10,115,189 B2
(45) Date of Patent: Oct. 30, 2018

(54) IMAGE PROCESSING APPARATUS, IMAGE PROCESSING METHOD, AND RECORDING MEDIUM

(71) Applicant: Ryosuke Kasahara, Kanagawa (JP)

(72) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 50 days.

(21) Appl. No.: 15/453,430

(22) Filed: Mar. 8, 2017

(65) Prior Publication Data

US 2017/0262974 A1  Sep. 14, 2017

(30) Foreign Application Priority Data

Mar. 14, 2016 (JP) ................................ 2016-049533

(51) Int. Cl.
| G06K 9/00 | (2006.01) |
| G06T 7/00 | (2017.01) |
| G06K 9/66 | (2006.01) |
| G06K 9/62 | (2006.01) |

(52) U.S. Cl.
CPC .......... *G06T 7/0004* (2013.01); *G06K 9/6201* (2013.01); *G06K 9/66* (2013.01); *G06T 7/001* (2013.01); *G06T 2207/20076* (2013.01); *G06T 2207/20081* (2013.01); *G06T 2207/30108* (2013.01); *G06T 2207/30164* (2013.01)

(58) Field of Classification Search
USPC ....................................................... 382/141
See application file for complete search history.

(56) References Cited

U.S. PATENT DOCUMENTS

| 5,793,888 A | * | 8/1998 | Delanoy | ........... G06F 17/30256 |
| | | | | 382/155 |
| 7,167,583 B1 | | 1/2007 | Lipson et al. | |
| 2004/0153979 A1 | * | 8/2004 | Chang | ................. G06F 17/5068 |
| | | | | 716/56 |
| 2010/0046829 A1 | * | 2/2010 | Mahajan | .................. G06K 9/40 |
| | | | | 382/159 |

(Continued)

FOREIGN PATENT DOCUMENTS

| GB | 2462851 A | 2/2010 |
| JP | 2004-502250 | 1/2004 |

(Continued)

OTHER PUBLICATIONS

Extended European Search Report dated Aug. 21, 2017 in Patent Application No. 17160407.7.

(Continued)

*Primary Examiner* — Jerome Grant, II
(74) *Attorney, Agent, or Firm* — Oblon, McClelland, Maier & Neustadt, L.L.P.

(57) ABSTRACT

An image processing apparatus is configured to process an image. The image processing apparatus includes: a calculator configured to calculate a parameter for each of a plurality of areas and for each of a plurality of models describing a plurality of body shapes, each of the plurality of models having the plurality of areas, and probabilities indicating to which of the plurality of models input images input for learning belong; and a comparator configured to compare an input inspection image with the plurality of models whose parameters are optimized based on the probabilities.

11 Claims, 11 Drawing Sheets

(56) References Cited

U.S. PATENT DOCUMENTS

| | | |
|---|---|---|
| 2011/0150325 A1 | 6/2011 | Hill et al. |
| 2014/0002591 A1* | 1/2014 | Wenxiu .................. G06T 5/005 |
| | | 348/42 |
| 2014/0294138 A1* | 10/2014 | Jerebko .................. A61B 6/025 |
| | | 378/4 |
| 2015/0206325 A1* | 7/2015 | Furihata ................ G06T 7/0073 |
| | | 382/154 |
| 2016/0171310 A1 | 6/2016 | Kasahara |
| 2017/0154234 A1 | 6/2017 | Tanaka et al. |
| 2017/0195654 A1* | 7/2017 | Powers .............. H04N 13/0253 |
| 2017/0294027 A1* | 10/2017 | Babenko .................. G06T 7/62 |
| 2017/0330315 A1* | 11/2017 | Okuda .................... G06T 7/001 |
| 2018/0012411 A1* | 1/2018 | Richey .................. G06T 19/006 |
| 2018/0040119 A1* | 2/2018 | Trenholm ............. G06T 7/0008 |
| 2018/0046645 A1* | 2/2018 | Chandraker ...... G06F 17/30256 |
| 2018/0047173 A1* | 2/2018 | Wang ..................... G06T 7/246 |
| 2018/0048894 A1* | 2/2018 | Chen .................... H04N 19/142 |

FOREIGN PATENT DOCUMENTS

| | | |
|---|---|---|
| JP | 2005-265661 | 9/2005 |
| JP | 2014-021973 | 2/2014 |
| JP | 2017-107541 A | 6/2017 |

OTHER PUBLICATIONS

"Expectation-maximization algorithm—Wikipedia", XP055397555, 2016, 10 Pages.

* cited by examiner

FIG.9
LEARNING IMAGES
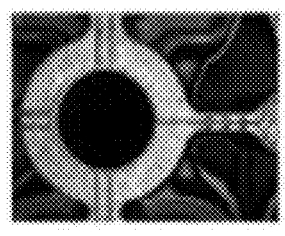
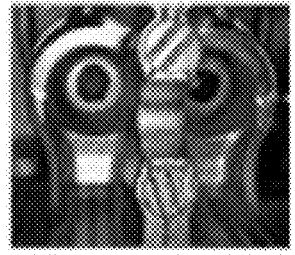
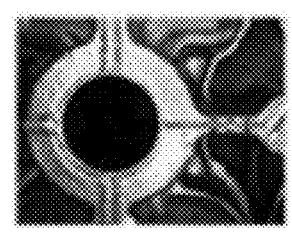
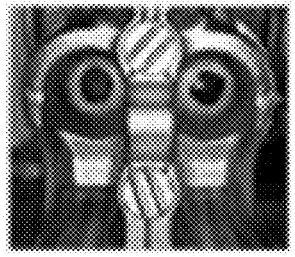
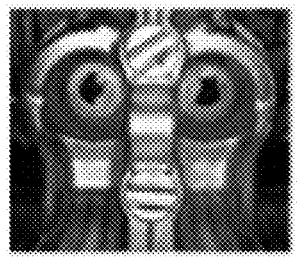
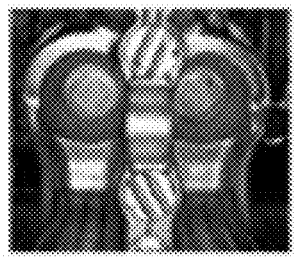
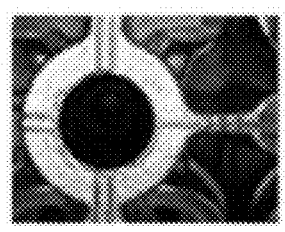
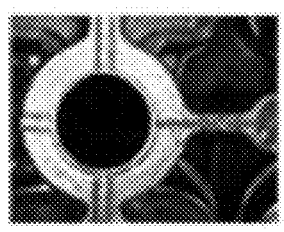
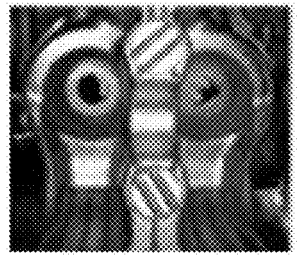

LEARNING RESULT IN CASE OF N=2 (N: NUMBER OF MODELS)

TEST RESULT IN CASE OF N=2 (N: NUMBER OF MODELS)

1110    1120

IMAGE PROCESSING APPARATUS, IMAGE PROCESSING METHOD, AND RECORDING MEDIUM

CROSS-REFERENCE TO RELATED APPLICATIONS

The present application claims priority under 35 U.S.C. § 119 to Japanese Patent Application No. 2016-049533, filed Mar. 14, 2016. The contents of which are incorporated herein by reference in their entirety.

BACKGROUND OF THE INVENTION

1. Field of the Invention

The present invention relates to an image processing apparatus, an image processing method, and a recording medium.

2. Description of the Related Art

It is known to utilise a machine learning algorithm to interpreting given data. Examples of what is determined by interpreting data include the state of data in view of the future development in a match of shogi, go, or the like, whether or not an object captured in an image is a person, and how the person is captured and what is a background in a captured scene. Machine learning is used in a wide range of applications including text identification, speech identification, image identification, and prediction of future progress, depending on data to which machine learning is applied.

Methods for discriminating a material or performing detect inspection using a machine learning algorithm are already known. However, the conventional material discrimination and the conventional defect inspection using machine learning are disadvantageous in that, if a plurality of targets of the same type but in different conditions are contained in an image, accuracy of material discrimination or defect inspection will be insufficient.

For example, when defect detection is performed on an image containing a plurality of targets, e.g., screws that differ from each other in thread starting position, it is possible that, even though the difference in the thread starting position is not a defect, a difference between images caused by a difference in the thread starting position is undesirably determined as a defect. If a threshold value for this determination is set to a value that permits the difference, tolerance for defects is also widened, which undesirably decreases defect detection sensitivity.

Image-based defect inspection methods are conventionally known. For example, Japanese Unexamined Patent Application Publication No. 2005-265661 discloses the following method. On a per-pixel basis, mean values and standard deviations of brightness values are calculated based on a group of images of good products provided in advance. In inspection, for each pixel of an image to be inspected, the deviation value of the brightness value is calculated (the mean value is subtracted from the brightness value and then the difference is divided by the standard deviation), and a pixel whose deviation value is higher than a preset threshold value is determined as anomalous (an outlier).

However, the technique described in Japanese Unexamined Patent Application Publication No. 2005-265661 is not suitable for inspection of targets such that a plurality of target are in an image and that thus vary widely.

SUMMARY OF THE INVENTION

According to one aspect of the present invention, an image processing apparatus is configured to process an image. The image processing apparatus includes a calculator and a comparator. The calculator is configured to calculate a parameter for each of a plurality of areas and for each of a plurality of models describing a plurality of body shapes, each of the plurality of models having the plurality of areas, and probabilities indicating to which of the plurality of models input images input for learning belong. The comparator is configured to compare an input inspection image with the plurality of models whose parameters are optimized based on the probabilities.

BRIEF DESCRIPTION OF THE DRAWINGS

FIG. 9 is a diagram illustrating learning images used in an implementation example;

The accompanying drawings are intended to depict exemplary embodiments of the present invention and should not be interpreted to limit the scope thereof. Identical or similar reference numerals designate identical or similar components throughout the various drawings.

DESCRIPTION OP THE EMBODIMENTS

Figure 1:
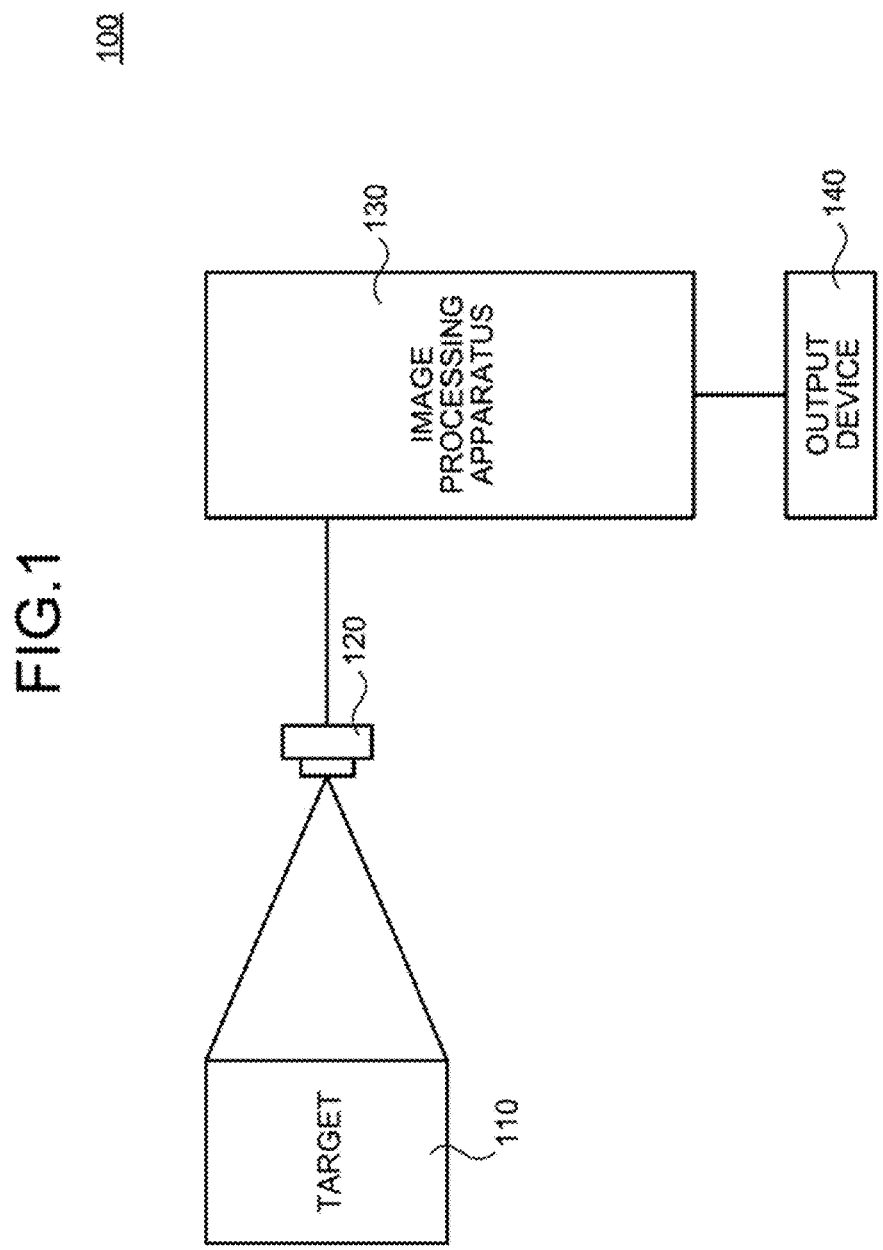
FIG. 1 is a schematic diagram of an image processing system 100 of an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings. An embodiment has an object to improve accuracy of image inspection using an image. However, it should be understood that the embodiments are not intended to limit the present invention. FIG. 1 is a schematic diagram of an image processing system 100 of an embodiment. The image processing system 100 of FIG. 1 is implemented as an image-based inspection system. The image processing system 100 includes a camera 120, an image processing apparatus 130, and an output device 140. The camera 120 captures an image of a target 110. The image processing apparatus 130 determines a state of the target 110 using the captured image.

A result of the determination made by the image processing apparatus 130 is sent to the output device 140. The output device 140 operates an external device such as an alarm, to give notice that the target 110 has a defect. The defect in the embodiment means any defect that is detectable from an image. Examples of the defect include a pinhole, a burr, and a crack.

Although the image processing apparatus 130 is illustrated as directly connected to the camera 120, in the present embodiment, alternatively, the camera 120 and the image processing apparatus 130 may be remotely arranged via a network. In this case, the image processing system 100 functions as a remote inspection system, in which the camera 120 may be connected to the image processing apparatus 130 via a wired or wireless network (not illustrated), such as Ethernet (registered trademark), Wi-Fi (registered trademark), LLE, 3G, and 4G. In a specific embodiment, the camera 120 may be integrated with the image processing apparatus 130 or attached to the image processing apparatus 130.

Figure 2:
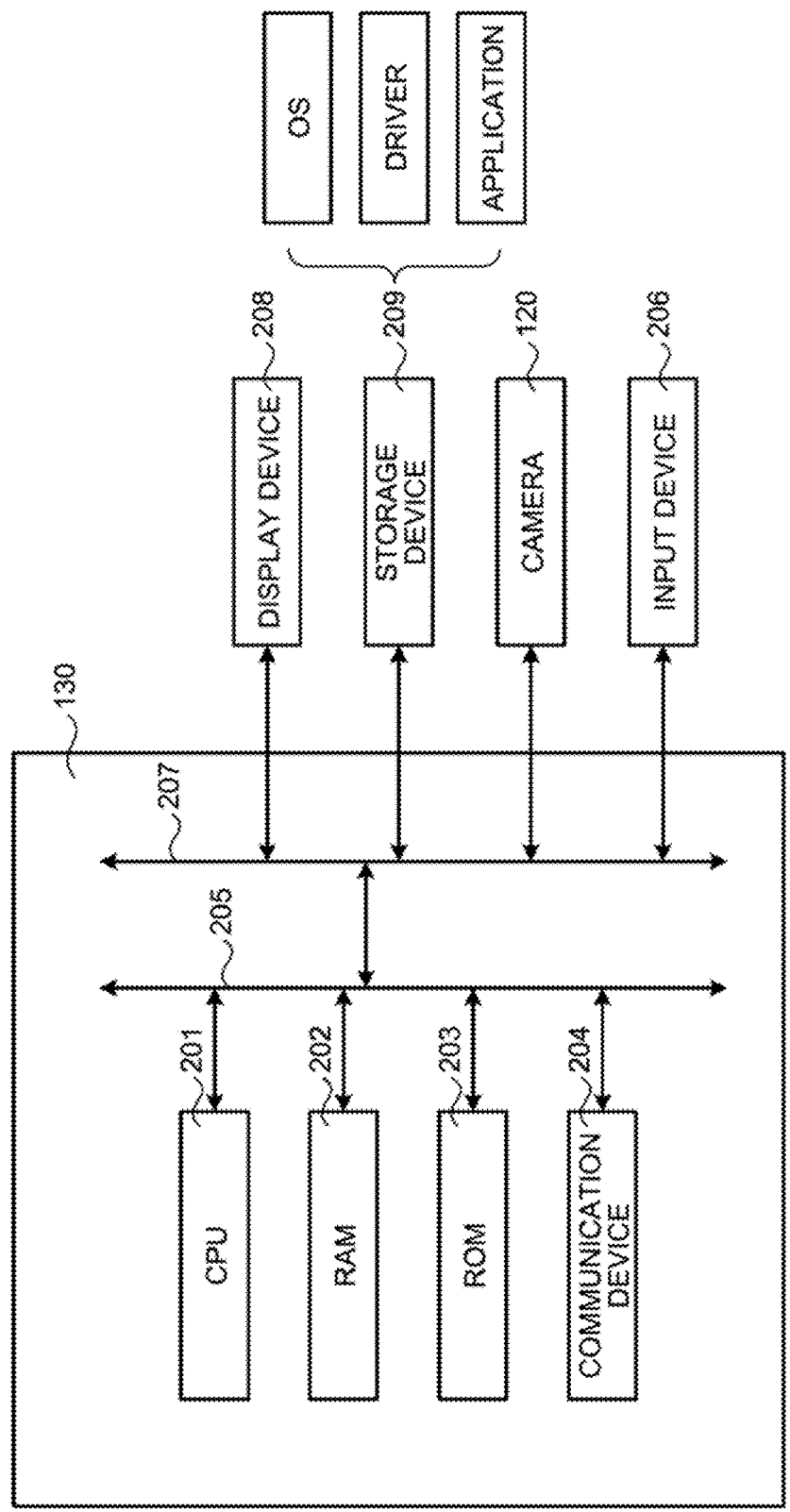
FIG. 2 is a diagram illustrating a hardware block 200 of an image processing apparatus 130 of the present embodiment.

FIG. 2 is a diagram illustrating a hardware block 200 of the image processing apparatus 130 of the present embodiment. The image processing apparatus 130 can be implemented as a personal computer, a workstation, or a dedicated image processing apparatus. The image processing apparatus 130 includes a CPU (Central Processing Unit) 201, a RAM (Random Access Memory) 202, a ROM (Read Only Memory) 203, and a communication device 204 that are mutually connected via a system bus 205. An I/O (input/output) bus 207 is connected to the system bus 205 via a bus bridge, such as PCI (Peripheral Component Interconnect) and PCI Express (registered trademark).

A display device 208, a storage device 209 such as an HDD (Hard Disk Drive), and the camera 120 are connected to the I/O bus 207 each via an appropriate protocol. In another embodiment, the camera 120 may be connected via the communication device 204. Specifically, the image processing apparatus 130 is connected to the display device 208 via an appropriate bus, such as a VGA (Video Graphics Array) bus, an HDMI (High-Definition Multimedia Interface) (registered trademark) bus, and a USB (Universal Serial Bus) bus to provide a video output to the display device 208. Another input device 206, such as a mouse and a keyboard, is connected to the image processing apparatus 130 to enable externally controlling the image processing apparatus 130.

Specific examples of the CPU used by the image processing apparatus 130 include, in addition to CPUs of Pentium (registered trademark) to Pentium IV (registered trademark), Atom, (registered trademark), Core2Duo (registered trademark), Core2Quad (registered trademark), Core (registered trademark) i series, and Xeon (registered trademark), Pentium compatible CPUs and CPUs of Power PC (registered trademark) and MIPS (registered trademark).

Examples of an operating system (OS) to be used include macOS (trademark), Windows (registered trademark), UNIX (registered trademark), Linux (registered trademark), Chrome (registered trademark), Android (registered trademark), and other appropriate operating systems. The image processing apparatus 130 can store an application program (s) described in a programming language, such as assembly language, C, C++, Visual C++ (registered trademark), Visual Basic, Java (registered trademark), Perl, and Ruby, operating on the above-described OS and execute the application program(s).

The CPU 201 mounted on the image processing apparatus 130 executes various programs stored in the RAM 202 or the storage device 209 so that various processing in the image processing apparatus 130 is implemented on the image processing apparatus 130. In another embodiment, the above-described functions may be implemented in an independent circuit(s) (hardware).

Figure 3:
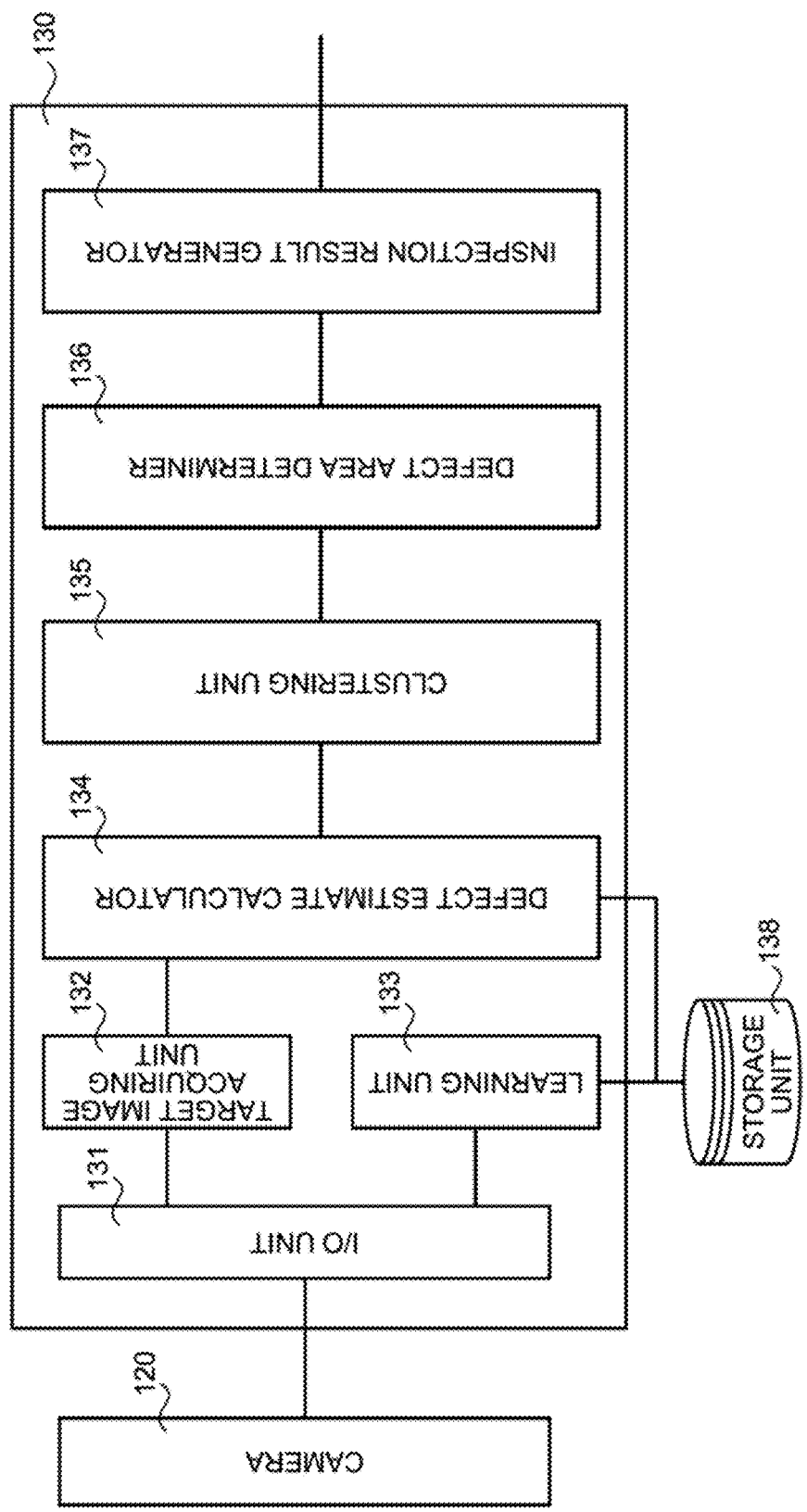
FIG. 3 is a diagram illustrating functional blocks of the image processing apparatus 130 of the present embodiment.

FIG. 3 is a diagram illustrating functional blocks of the image processing apparatus 130 of the present embodiment. The camera 120 is also illustrated for clarity of information flow in the embodiment illustrated in FIG. 3. The camera 120 corresponds to an image capturer in the present embodiment. The functional blocks of FIG. 3 include an I/O unit 131, a target image acquiring unit 132, and a learning unit 133. The I/O unit 131 allocates an image acquired by the camera 120 to the target image acquiring unit 132: or the learning unit 133 according to a learning sequence and an inspection sequence. The target image acquiring unit 132 temporarily stores image data: sent from the I/O unit 131 in, for example, the RAH 202: or an image RAH (not illustrated) dedicated to images to store an image until, completion of downstream processing.

In the present embodiment, the image acquired by the target image acquiring unit 132 may be stored in a storage unit 138 so that, when an inspection result is generated, the image can be output as an image output with the inspection result superimposed thereon. The image may be associated with an identification value, by which the target 110 can be uniquely identified, and stored in the storage unit 138 as an inspection log.

The learning unit 133 acquires images that are with no defect and captured in advance by the camera 120 for learning, thereby learning the images of the target 110, which is a good product. The targets 110 may be a plurality of bodies of different shapes. Alternatively, components, bodies, or other objects having a plurality of shapes may be captured in an image of the single target 110, and a portion of the image may be cut out and processed.

In the present embodiment, an image generated by capturing images of the targets 110 which are good products, and learning the images is used as a model for images of the targets 110. In the present embodiment, images of a plurality of bodies of different shapes are learned to give plurality of models of k types (k is a natural number). Functional units (i.e., the target image acquiring unit 132 and the learning unit 133) that acquire images of the targets 110 with no defect correspond to a unit that acquires a plurality of images while associating the images with a plurality of models, in the present embodiment. A functional unit (i.e., the learning unit 133) that provides the learning function corresponds to an optimizer in the present embodiment.

The image processing apparatus 130 further includes a defect estimate calculator 134, a clustering unit 135, a defect area determiner 136, and an inspection result generator 137. The defect estimate calculator 134 calculates probabilities indicating to which one(s) of the models acquired by the learning unit 133 an image of the target 110 belongs and, using a single or a plurality of model(s) determined therefrom, calculates defect estimates on a per-pixel basis. The defect estimate calculator 134 corresponds to a calculator and a comparator in the present embodiment.

The clustering unit 135 clusters the defect estimates calculated about the pixels by magnitude to determine a pixel(s) having a defect estimate larger than a preset threshold value, for example. The clustering unit 135 corresponds to a detector in the present embodiment. The defect area determiner 136 determines that a group of pixels each having a defect estimate larger than the preset threshold value as a defect, and transmits a result of this determination to the inspection result generator 137. The defect area determiner 136 may further provide a function that screens data that exceeds, due to a noise or the like, a threshold value preset on a per-pixel basis or issues an alarm about such data.

The inspection result generator 137 performs, in accordance with the determination made by the defect area determiner 136, for example, a process or rendering an image indicating the defect on the image, a process of generating a list with the identification value of the target 110 and information indicating whether or not a defect is detected, or a process of causing the image processing apparatus 130 to issue an alarm or display an image indicating that a defect is found.

An inspection result to be generated in the present embodiment can be of any scheme, format, and form so long as whether the target 110 is a good product or a defective product can be identified and image data can be checked as required.

An image processing method of the present embodiment is described in detail below while describing functions of the functional units illustrated in FIG. 3. Processing illustrated in FIG. 4 corresponds to a learning stage in the present embodiment and is processing to be performed by the learning unit 133 illustrated in FIG. 3. The CPU 201 mounted on the image processing apparatus 130 loads a program(s) of the present embodiment into the RAM 202 and executes the program(s) to cause respective hardware elements of the image processing apparatus 130 to operate, thereby causing the image processing apparatus 130 to function as the functional units, to implement processing of FIG. 4 and processing of FIG. 5 which will be described later.

The image processing method of the present embodiment starts from S400. At S401, images to do learned are acquired. A statistical process of the present embodiment is performed as follows. Pixel values of pixels(x,y) are acquired from the images. Mean pixel values, each of which is a mean value of the pixel values at a pixel(x,y) acquired from the plurality of images, and variances at the pixels are obtained. The mean pixel value corresponds to the first parameter in the present embodiment. The pixel variance corresponds to the second parameter in the present embodiment. Although the statistical process of the present invention is performed using the mean values and the variances in this example, any parameter that describes probability distribution of pixel values may be used and there is no particular limitation.

When the images are acquired, a model identification value may be assigned to images of the same target so that learning is performed while performing association. In another embodiment, without associating each model with a corresponding model identification value, responsibility of each model which is a probability for identifying the model, may be optimised during parameter optimization in an EM (expectation-maximization) algorithm which will be described later. In the configuration in which each model is identified by a model identification value, a two-dimensional code or the like into which the model identification value is encoded, may be embedded in a portion where the target is not imaged, of the image, so that the model identification value can be read out simultaneously with the reading of the image.

The number of models to be used may be arbitrarily set by a user and is not specifically limited.

Thereafter, a learning process that uses the EM algorithm that uses the mean pixel value and the pixel variance as parameters is performed at S402. In the learning algorithm of the present embodiment, a z-score is used as a first feature. The z-score is given by the following Equation (1).

$$Z_{nk}(x, y) = \frac{I_n(x, y) - \mu_k(x, y)}{\sqrt{\sigma_k^2(x, y)}} \quad (1)$$

In Equation (1), $I_n(x,y)$ is a pixel value of the $n^{th}$ image to be learned; $\mu_k(x,y)$ is the mean pixel value at a pixel (x,y) of the $k^{th}$ model image; $\sigma_k^2(x,y)$ is the variance at the pixel (x,y) of the $k^{th}$ model image.

In the formulation described above, the z-score has a function of giving the deviation value of the $n^{th}$ image from the $k^{th}$ model image at the pixel (x,y); the z-score is a value representing the distance from the mean value on an assumption that the probabilistic model follows a normal deviation. In the present embodiment, an example where the z-score is used as the first feature is described; however, the first feature is not limited to the z-score, but can be any feature that allows probabilistic model calculation using the pixel values.

In the present embodiment, as a second feature of the EM algorithm, a joint probability $e_{nk}$, which is given by the following Equation (2), of the input image $I_n$ and the entire image corresponding to the $k^{th}$ model is calculated.

$$e_{nk} = \prod_{x=1}^{x} \prod_{y=1}^{y} e^{-\left(\frac{z_{nk}(x,y)^2}{2}\right)} \quad (2)$$

The z-score is substituted to a standard normal distribution with mean 0 and variance 1, a probability of each of pixels is obtained, and the product of the probabilities on a per-pixel basis or on a per-area basis is calculated to calculate the joint probability $e_{nk}$. In Equation (2), each of X and Y is the number of pixels or the input image. In the present embodiment, $e_{nk}$ is calculated from distribution of pixel values across the entire image rather than on a per-pixel basis. In this example, the joint probability $e_{nk}$ for the entire image is calculated. According to the present embodiment, probabilities as to which of the models an input image belongs can be appropriately obtained in view of all the parts of the input image.

Furthermore, in the EM algorithm of the present embodiment, a responsibility $\gamma_{nk}$, which corresponds to a value of expectation that each of input images is classified to each of the models, is calculated using the above-described probability $e_{nk}$ from the following Equation (3). In Equation (3), N is a total number of the input images; K is the number of the models.

$$\gamma_{nk} = \frac{\sum_{n=1}^{N}(e_{nk})e_{nk}}{\sum_{k=1}^{N}[\sum_{n=1}^{N}(e_{nk})e_{nk}]} \quad (3)$$

In the present embodiment, the model learning process is performed at S402. The model learning process will be described in detail later. After completion of the model learning, the first parameter and the second parameter that characterize the models are stored in a storage device so that the parameters can be used in inspection, recognition, determination, and the like of the target.

Figure 4:
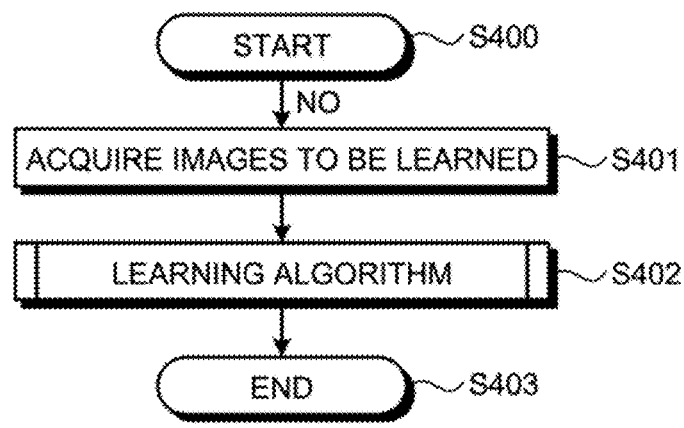
FIG. 4 is a flowchart of processing to be performed at a learning stage of the present embodiment.
Figure 5:
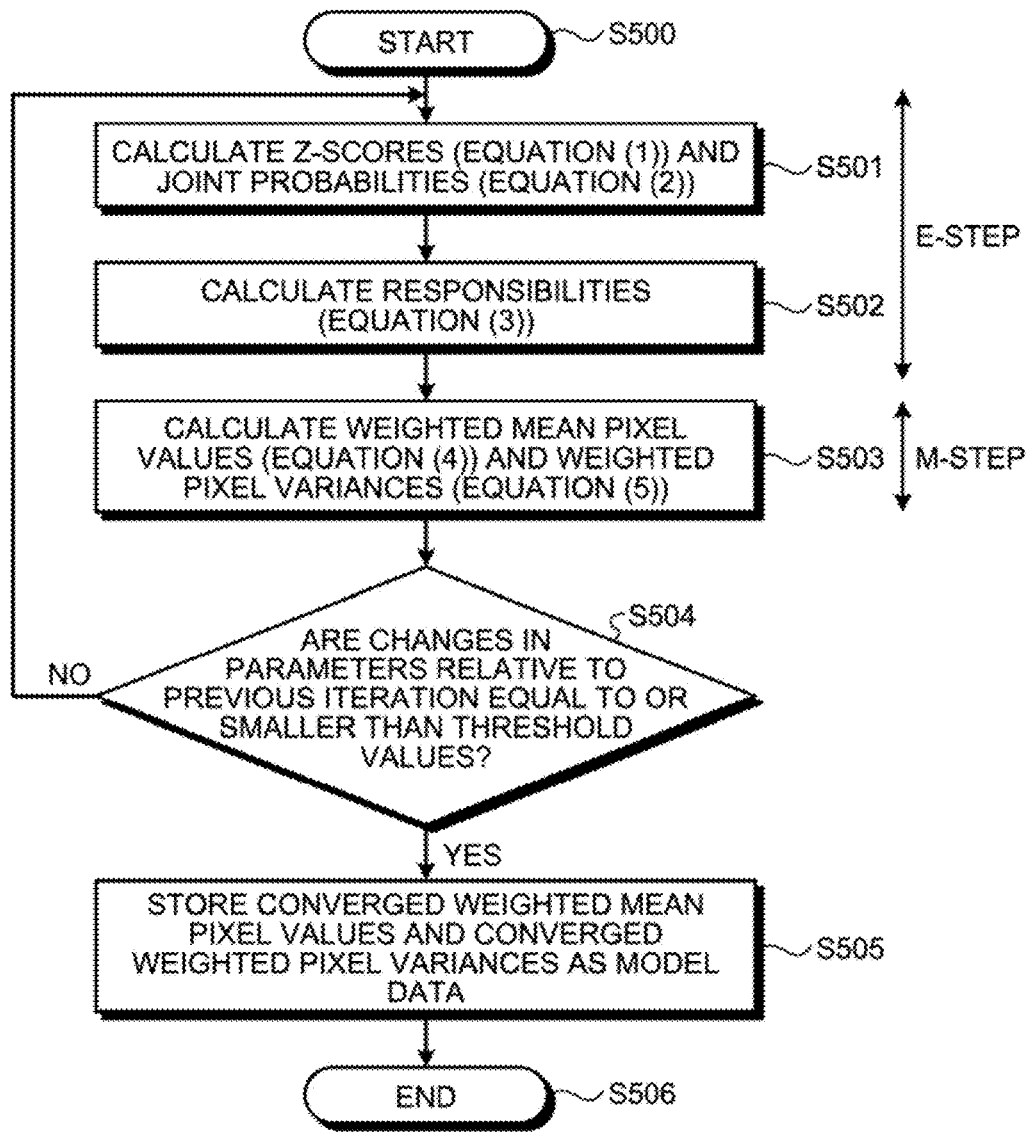
FIG. 5 is a detailed flowchart of processing to be performed at a learning step S402, described with reference to FIG. 4 of the present embodiment.

FIG. 5 is a detailed flowchart of the learning process to be performed at S402, which is the learning step, described with reference to FIG. 4 of the present embodiment. In FIG. 5, S501 and S502 correspond to an E (expectation)-step, and S503 corresponds to an M (maximization)-step. The E-step and the M-step make up the EM algorithm implemented in the present embodiment. Processing of FIG. 5 starts from S500. At S501, the z-scores, which are the first feature given by Equation (1), and the joint probabilities given by Equation (2) are calculated.

At S502, the model's responsibility given by Equation (3) is calculated using the calculated z-scores and joint probability. Thereafter, weighted mean pixel values and weighted pixel variances are calculated at S503 using the responsibility as a weight, and stored in a storage device.

The weighted mean pixel value and the weighted pixel variance described above are given by Equation (4) and Equation (5) below.

$$\mu_{nk}(x, y) = \frac{1}{N_k}\sum_{n=1}^{N} \gamma_{nk} I_n(x, y) \quad (4)$$

$$\sigma_k^2(x, y) = \frac{1}{N_k}\sum_{n=1}^{N} \gamma_{nk}\{\mu_k(x, y) - I_n(x, y)\}^2 \quad (5)$$

In Equation (4) and Equation (5), $N_k$, given by Equation (6), is a summation of the responsibilities and is a normalization constant of Equation (4) and Equation (5).

$$N_k = \sum_{n=1}^{N} \gamma_{nk}$$

Thereafter, at S504, whether or not the difference between each of the mean pixel values calculated in the previous iteration and a corresponding one of the mean pixel values calculated at S503 is equal to or smaller than a preset threshold value and whether or not the difference between each of the pixel variances calculated in the previous iteration and a corresponding one of the pixel variances calculated at S503 is equal to or smaller than a preset threshold value are determined. When the differences are smaller than the threshold values (yes at S504), the converged mean pixel values and the converged pixel variances are stored as data for a corresponding image at S505 so that the data can be used in future inspection.

On the other hand, when any of the differences between the values exceeds a corresponding one of the threshold values (no at S504), processing is caused to return to S501 to repeat calculation of the z-scores, the joint probability, and the responsibility $\gamma_{nk}$. The above-described iteration is performed until each of the differences between the values becomes equal to or smaller than a corresponding one of the threshold values. When a result of the determination made at S504 is "yes", the current mean pixel values and the current weighted pixel variances are stored as model data at S505. Then, processing ends at S506.

An initial value of the pixel variance and an initial value of the mean pixel value at start of the learning may be a random number and 1, respectively. If one of the models to which an input image is to be classified is explicit, such as when a user can classify the input image while viewing the input image, values of the input image may be used as initial values of mean pixel values of the model.

Figure 6:
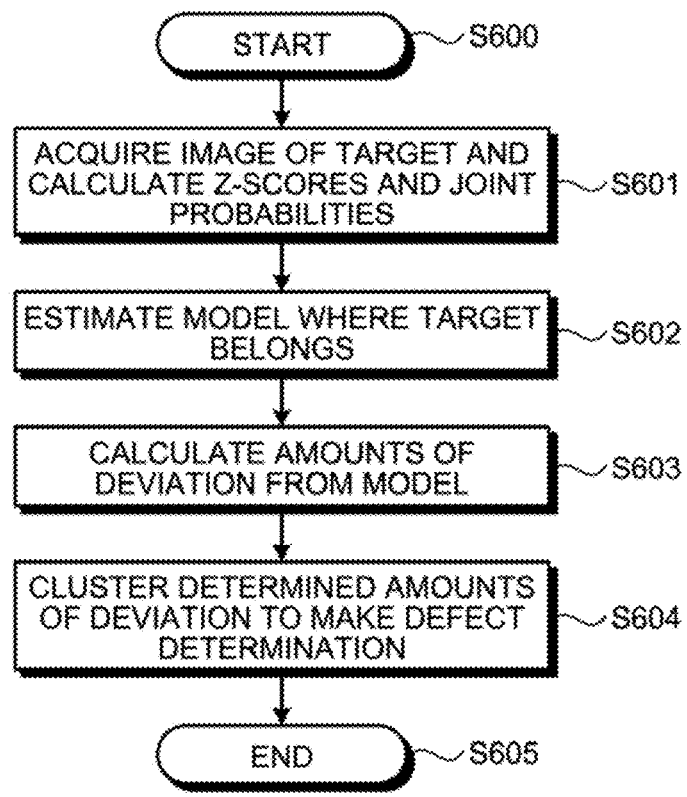
FIG. 6 is a flowchart of processing to be performed at an inspection stage of an image processing method of the present embodiment.

FIG. 6 is a flowchart of processing to be performed at an inspection stage of the image processing method of the present embodiment. Processing of FIG. 6 starts from S600. At S601, the target image acquiring unit 132 acquires an image of a target; the defect estimate calculator 134 receives the image and calculates z-scores and joint probabilities from Equation (1) and Equation (2). At S602, the defect estimate calculator 134 calculates the joint probabilities and the responsibilities $\gamma_{nk}$ to estimate a model, which is a hidden variable, where the target 110 belongs. In some cases, the responsibility $\gamma_{nk}$ may be 1 only for a certain model k but is 0 for the other models. In other cases, the responsibility $\gamma_{nk}$ may be, for example, 0.5 for each of two models in such a manner that a plurality of models are mixed. Thus, the number of models where the target 110 belongs is not limited to one.

At S603, after the model is estimated, defect estimates are calculated using the following Equation (7).

$$S_n(x, y) = \sum_{k=1}^{N} \frac{e_{nk}}{\sum_{k=1}^{N}(e_{nk})}|Z_{nk}(x, y)| \quad (7)$$

As described earlier, because $Z_{nk}$ can be an index of the deviation distance from the mean. Accordingly, $Z_{nk}$ has a characteristic that when the target has a defect at pixel (x,y), the value of large, whereas when the pixel value is close to the mean value at pixel (x,y), the value of $S_n$ (x,y) approaches zero. Accordingly, at S604, the clustering unit 135 clusters the values of the $S_n$ (x,y) to determine a defect of the target. The defect area determiner 136 may eliminate, from the defect detection, pixels lying in an area of a size equal to or smaller than a minimum size of defect that can occur in the target, in the light of computational error or the like. After the determination at S604, processing proceeds to S605 where an inspection result is generated and processing ends.

Figure 7:
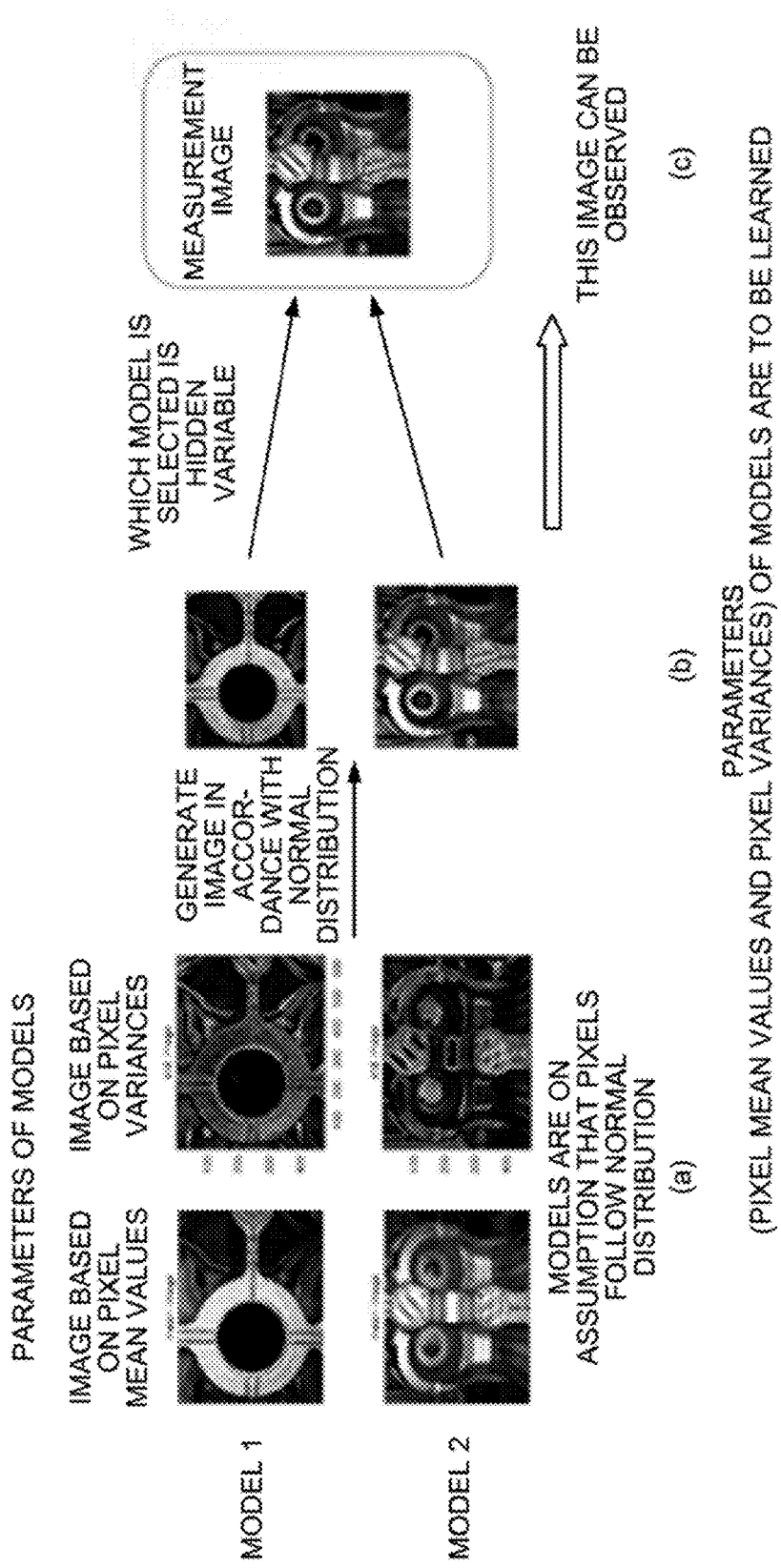
FIG. 7 is an image-based explanatory diagram of a model estimation process 700 that uses a hidden variable of the present embodiment.

FIG. 7 is an explanatory diagrams of model estimation, on which processing 700 of the present embodiment is based. Description with reference to FIG. 7 is made on an assumption that, for simplicity of description, the number of types of the models is two (K=2). In this example, as illustrated in FIG. 7, it is assumed that two models, in each of which pixels follow a normal distribution, are given and an image to be observed is generated from any one of the models. To which of the models the observed image belongs is unknown and is a hidden variable. When learning is completed or, put another way, when model estimation is completed, pixel mean images and pixel variance images, at the left of FIG. 7, of the respective models are obtained. Based on the two images, whether or not an input image has a defect is detected in the test.

In the present embodiment, when the learning step ends, mean values and variances that optimize the responsibilities $\gamma_{nk}$ are determined and stored at S505 of FIG. 5. FIG. 7 illustrates, at (a), visualized model data obtained by mapping the pixel mean values and the pixel variances determined at S505 to pixels (x,y).

In the present embodiment, a model, which is the hidden variable, is estimated, selected, or taken into consideration with weights assigned thereto from a measurement image using the pixel value distributions illustrated at (a) in FIG. 7 and based on the joint probabilities $e_{nk}$ given by Equation (2) and the responsibilities $\gamma_{nk}$ given by Equation (3). Estimating defect amounts based on the thus-made selection enables highly accurate defect estimation even when a plurality of images are given.

Figure 8:
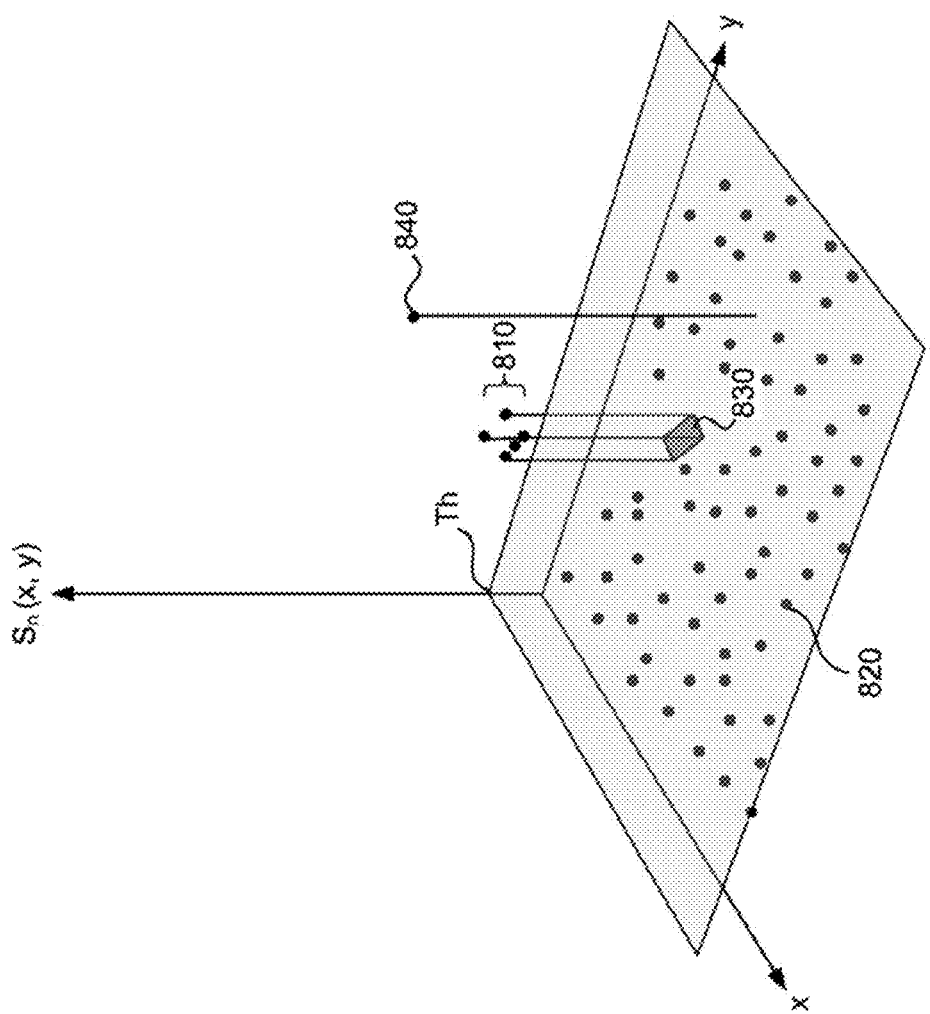
FIG. 8 is a conceptual diagram of a process that clusters defect estimates to perform defect estimation in the present embodiment.

FIG. 8 is a conceptual diagram of a process that clusters defect estimates to perform defect estimation in the present embodiment. FIG. 8 is a diagram schematically illustrating the defect estimates $S_n$ (x,y) plotted at positions corresponding to corresponding pixels (x,y). The value of $S_n$ (x,y) is small at pixels that are not estimated as belonging to an image defect.

By contrast, at pixels estimated as belonging to a defect 830, the value of $S_n$ (x,y) is large. Accordingly, defect estimates $S_n$ (x,y) 810 of a pixel group corresponding to the defect 830 are larger than of an area surrounding the defect 830. Defect estimation can be performed as follows, for example. A threshold value Th is preset for the defect estimates $S_n$ (x,y). An area where the defect estimate $S_n$ (x,y) exceeds the threshold value Th is estimated as a defect area. A scheme that does not set the threshold value Th but associates the defect estimates $S_n$ (x,y) with, for example, lightness of a to-be-displayed image and performs color mapping of the defect estimates $S_n$ (x,y), thereby displaying the defect area with high lightness may be employed.

Besides the above, it is probable that the image has a defect estimate $S_n$ (x,y) 840 of a pixel that is produced by some cause in a spot-like manner. In a specific embodiment, such a pixel produced in the spot-like manner is not estimated as a defect. However, an output for urging a user to view an image and confirm that the pixel is not an image defect may be produced.

The present embodiment is described below through an implementation example. As sample images, images produced by processing the assignment images of the "Visual Inspection Algorithm Contest 2014, Technical Committee on Industrial Application of Image Processing" (the Visual Inspection Algorithm Contest 2014, organized by the Technical Committee on Industrial Application of Image Processing, the Japan Society of Precision Engineering) are used. FIG. 9 is a diagram illustrating learning images used in the present implementation example. As can be seen from FIG. 9, the learning images contain two model images (k=2). The images illustrated in FIG. 9 are applied to processing described with reference to FIG. 4 and FIG. 5 to estimate the respective models from the measurement image illustrated at (c) in FIG. 7.

Figure 10A:
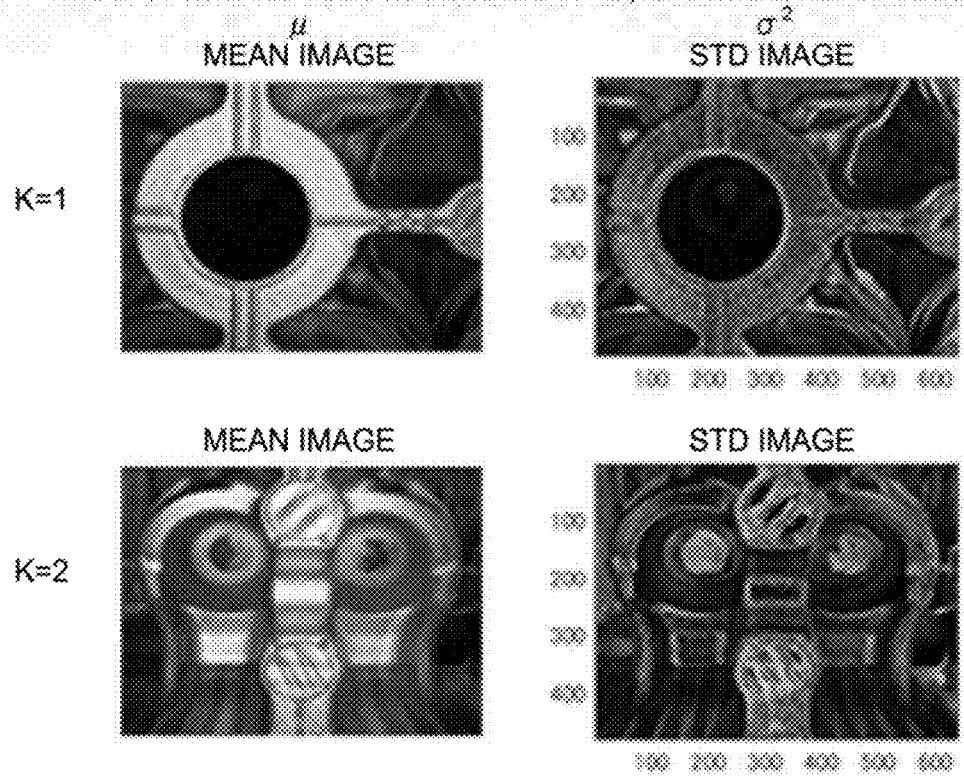
FIG. 10A and FIG. 10B are diagrams illustrating a result of image-based inspection of an actual target by use of models built through learning.
Figure 10B:
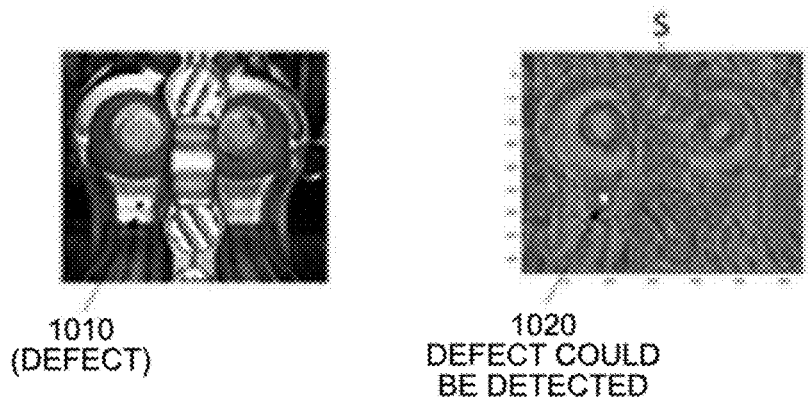

Image-based inspection of an actual target is performed using the models generated in this manner. FIG. 10A and FIG. 10B illustrate a result of the inspection, FIG. 10A is a diagram illustrating models visualized as images, in which the images or the left are mean images representing pixel mean values of the respective models, while the images on the right are variance images representing pixel variances of the same. FIG. 10A indicates that the present embodiment successfully separates the models clearly.

FIG. 10B illustrates a defect estimate map S generated in accordance with the present embodiment. The defect estimate map S is generated as follows. The calculation according to the present embodiment is applied to a target to be inspected. In the manner illustrated in FIG. 8, the defect estimates $S_n$ (x,y) are mapped to pixels(x,y) while assigning low lightness (B) to each pixel where the value of $S_n$ (x,y) is zero and associating the defect amount $S_n$ (x,y) with lightness. In FIG. 10B, the image on the left is the image of the target to be inspected, while the image on the right is the defect estimate map. FIG. 10B indicates that a defect 1010 that is noticeable in the target is clearly identified as a defect 1020 also in the defect estimate map S. As described above, it is indicated that the present embodiment can sufficiently increase defect detection sensitivity even when a plurality of shapes are learned in a mixed fashion.

Figure 11A:
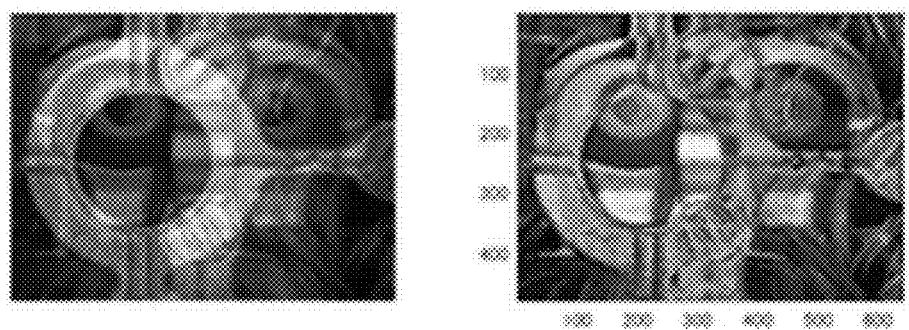
FIG. 11A and FIG. 11B are diagrams illustrating a result of learning models using a conventional method.
Figure 11B:
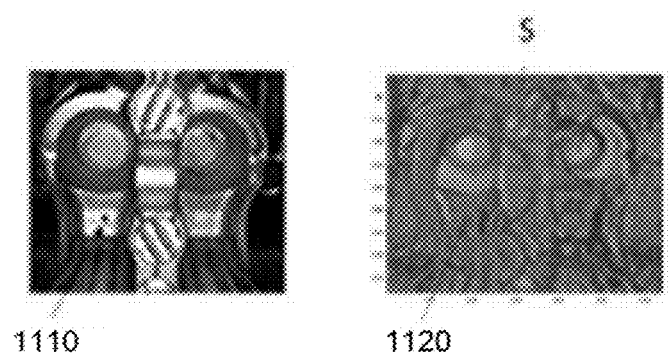

FIG. 11A and FIG. 11B are diagrams illustrating a result of learning models using a conventional method (in which learning is performed with a single model) (comparative example). FIG. 11A is a diagram illustrating models visualized as images, in which the image on the left is a mean image of the respective models, while the image on the right is a variance image of the same. As illustrated in FIG. 11A, with the conventional method, the two models are learned as being undesirably superimposed on one another, and each of the mean image and the variance image exhibits a shape, in which the two models are mixed.

FIG. 11B illustrates a result of inspection performed with the learned state illustrated in FIG. 11A using the conventional method. FIG. 11B illustrates the defect estimate map S generated in accordance with the present embodiment. In the conventional method, k of the defect estimate map S is fixed to one (k=1). The calculation according to the present embodiment is applied to a target to be inspected. FIG. 11B is an image of the target generated by, in the manner illustrated in FIG. 8, mapping the defect estimates $S_n$ (x,y) to pixels (x,y) while assigning the low lightness (B) to each pixel where the value of $S_n$ (x, y) is zero and associating the defect estimate $S_n$ (x,y) with lightness. The defect estimate map is presented on the right of FIG. 11B. FIG. 11B indicates that although a defect 1110 noticeable in the target is discernible as a defect 1120 by shades of a color, as illustrated in FIG. 11B, the defect 1120 is not sufficiently identifiable among the other areas.

As described above, it is indicated the present embodiment can increase defect detection sensitivity sufficiently even when a plurality of shapes are learned as images in a mixed fashion. Accordingly, the present embodiment can provide an image processing apparatus, an image processing method, an image processing system, and a computer-readable recording medium, each enabling efficient detection of an anomaly in an image even when a plurality of shapes are learned simultaneously.

According to an embodiment, accuracy of image inspection can be increased.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are hot limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSPS), field programmable gate array FPGA) and conventional circuit components arranged to perform the recited functions.

What is claimed is:

1. An image processing apparatus configured to process an image, the image processing apparatus comprising:
    a calculator configured to calculate
        a parameter for each of a plurality of areas add for each of a plurality of models describing a plurality of body shapes, each of the plurality of models having the plurality of areas, and
        probabilities indicating to which of the plurality of models input images input for learning belong; and
    a comparator configured to compare an input inspection image with the plurality of models whose parameters are optimized based on the probabilities.

2. The image processing apparatus according to claim 1, further comprising an optimizer configured to use the probabilities indicating to which of the plurality of models the inspection image belongs, as a hidden variable, to optimize the parameters.

3. The image processing apparatus according to claim 1, wherein the calculator is configured to calculate the probabilities for the plurality of areas in the plurality of models.

4. The image processing apparatus according to claim 3, wherein the calculator is configured to calculate probabilities indicating to which of the plurality of models the input images belong using products of the probabilities calculated for the plurality of areas.

5. The image processing apparatus according to claim 2, wherein the optimizer is configured to optimize the parameters using an expectation-maximization algorithm.

6. The image processing apparatus according to claim 3, wherein the optimizer is configured so optimize the parameters using an expectation-maximization algorithm.

7. The image processing apparatus according to claim 1, further comprising a detector configured to detect a defect area in the inspection image based on a result of comparison made by the comparator.

8. The image processing apparatus according to claim 1, further comprising a calculation unit configured to calculate an amount of deviation based on the probabilities and degrees of coincidence of the inspection image with the plurality of models.

9. The image processing apparatus according to claim 1, further comprising an input unit configured to receive a number of the plurality of models.

10. An image processing method to be performed by an image processing apparatus configured to process an image, the image processing method comprising:
    calculating a parameter for each of a plurality of areas and for each of a plurality of models describing a plurality of body shapes, each of the plurality of models having the plurality of areas;
    calculating probabilities indicating to which of the plurality of models input images input for learning belong; and
    comparing an input inspection image with the plurality of models whose parameters are optimized based on the probabilities.

11. A non-transitory computer-readable recording medium including programmed instructions that cause a computer mounted on an image processing apparatus configured to process an image, to perform:
    calculating a parameter for each of a plurality of areas and for each of a plurality of models describing a plurality of body shapes, each of the plurality of models having the plurality of areas;
    calculating probablities indicating to which of the plurality of models input images input for learning belong; and
    comparing an input inspection image with the plurality of models whose parameters are optimized based on the probablities.

* * * * *